(No Model.)
2 Sheets—Sheet 1.
E. THOMSON.
COMMUTATOR FOR DYNAMO ELECTRIC MACHINES.
No. 271,947. Patented Feb. 6, 1883.
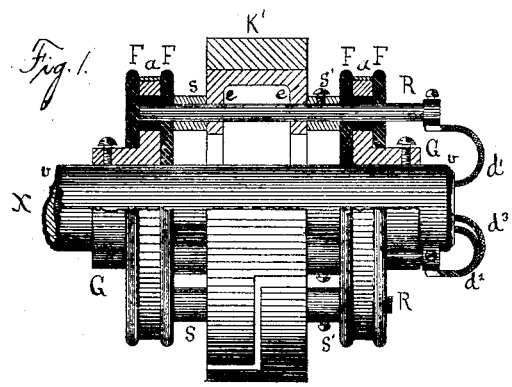
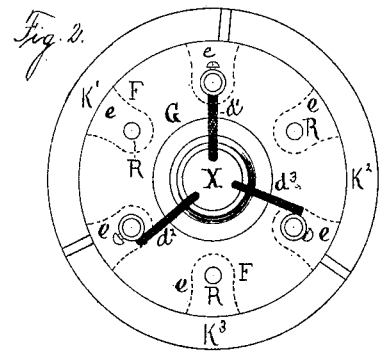
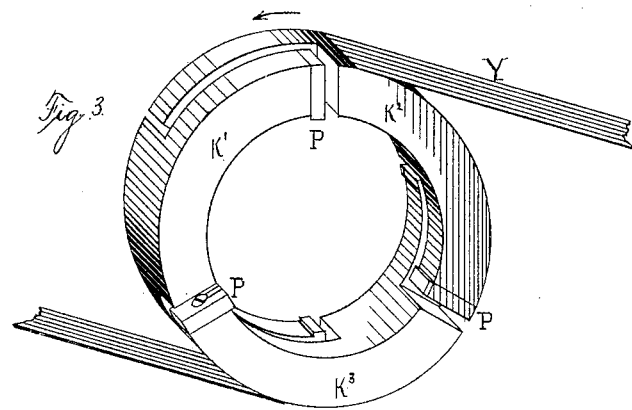
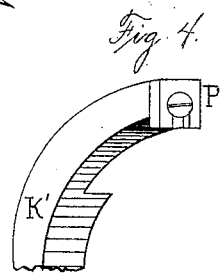
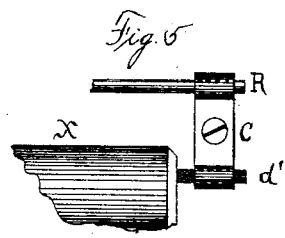
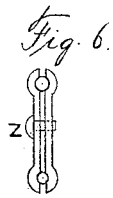
Witnesses
N. B. Thomson
J. B. Norton
Inventor
Elihu Thomson
H. C. Townsend
Atty
N. PETERS. Photo-Lithographer, Washington, D. C.

(No Model.) 2 Sheets—Sheet 2.
E. THOMSON.
COMMUTATOR FOR DYNAMO ELECTRIC MACHINES.
No. 271,947. Patented Feb. 6, 1883.
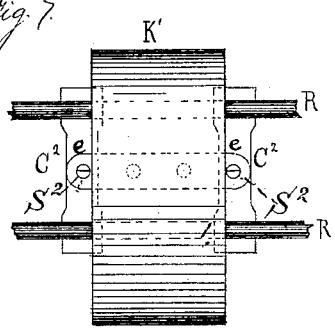
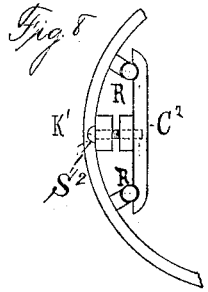
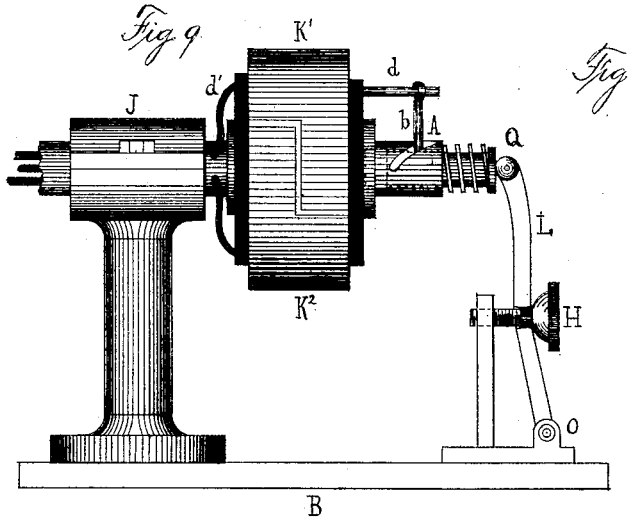
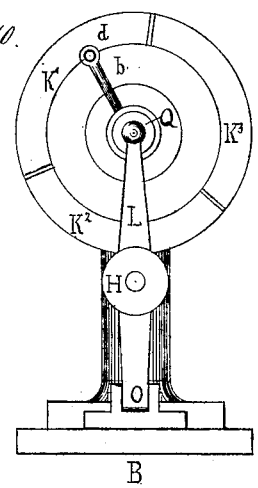

UNITED STATES PATENT OFFICE.

ELIHU THOMSON, OF NEW BRITAIN, CONNECTICUT, ASSIGNOR TO THE AMERICAN ELECTRIC COMPANY, OF SAME PLACE.

COMMUTATOR FOR DYNAMO-ELECTRIC MACHINES.

SPECIFICATION forming part of Letters Patent No. 271,947, dated February 6, 1883.

Application filed March 2, 1882. (No model.)

*To all whom it may concern:*

Be it known that I, ELIHU THOMSON, a resident of New Britain, county of Hartford, State of Connecticut, have invented certain new and useful Improvements in Commutators for Dynamo-Electric Machines, of which the following is a specification.

My invention relates to improved means of constructing and connecting the commutators of dynamo-electric machines in which there are several segments of a ring employed.

Figure 1 is a side view of the commutator insulated according to my present invention. It is partly in section. Fig. 2 is an end view of the same. Fig. 3 shows an attachment or wearing-edge applied to the segments. Fig. 4 shows a single segment removed, with its wearing-edge. Fig. 5 shows connector for uniting terminals of the armature-coils to the commutator; Fig. 6, another view of the same. Fig. 7 is a view showing my improved means of replacing the segments of the commutator. Fig. 8 is a side view of the same. Fig. 9 shows my improved means of rendering the commutator adjustable in position while rotating. Fig. 10 is an end view of the same.

In Figs. 1 and 2, X is a hollow shaft of an electric motor or dynamo-electric machine, through which the armature-coil terminals $d'$ $d^2$ $d^3$ pass, and upon which are placed plates or flanges G G, faced with insulating-plates F F F F. Between the said plates F F, and encircling the edge of G, are bands of paper $a$ $a$, or other insulator, or extensions of the plates F F, if convenient to so construct them.

Supported by the plates G G, but insulated from them, are rods R R, &c., as shown. Upon these rods the segments of the commutator are mounted in a convenient way, sleeves S S and S' S' serving to prevent lateral movement of the rods and segments, as shown in prior patents. The armature-coil terminals $d'$ $d^2$ $d^3$ are attached to some of these rods. Projections $e$ $e$, or ears upon each segment, are provided for a fastening and support of each segment upon the rods R R. As here shown, the rods pass through perforations in the ears. At least two supports are used for each segment, and as the rods R R are insulated from one another no contact between the segments is permitted.

My object in constructing the insulating-supports of the segments as described is to so cover and protect them by extended surfaces of insulation as to prevent discharge from segment to segment.

It is well known that where surfaces of insulation of small extent become covered with fine metal-dust worn from the commutator they lose their insulating power.

In furtherance of my object, the shaft X may have an outside coating of insulator, $v$ $v$, as indicated. By this means I effectually seal from exposure those metal surfaces not engaged in the conduction of current.

My present improvements are not for a specific design of commutator of a given number of segments, and I therefore do not limit myself in this respect. I find, however, that they are particularly adapted to a three-segment commutator, and such is shown in the figures. To save complication I have reserved other parts of my invention for the separate figures.

The segments of the commutator K' K² K³ are made with adjustable and replaceable wearing-edges P, Figs. 3 and 4, fastened to that part of the segment, as K', which makes the last contact with the brush Y, and fastened by a screw to be fed outward as they wear, and are slotted for the purpose. This is the part most subject to wear in running, and it is desirable, therefore, to construct it as I have described.

Instead of bending the wires $d'$ $d^2$ $d^3$ to unite them with the rods R, Fig. 1, I prefer to use a double-clamp connector, leaving the wires $d'$ $d^2$ $d^3$ projecting straight from the end of the shaft. This connector is shown in Figs. 5 and 6. It consists of two plates grooved to receive the rod R and wire $d'$, and united by a screw, Z, Fig. 6. It forms a simple and rapid means of connecting and disconnecting. The removal of the commutator from the shaft X, Fig. 1, is facilitated and the risk of damaging the wires $d'$ $d^2$ $d^3$ by bending and unbending removed. In like manner I prefer to make the segments of the commutator easily detachable from their supporting-rods or frame-work. The general plan of my method of so constructing the commutator is exhibited in Figs. 7 and 8. Each segment is provided with projecting lateral ears $e$ $e$, secured to or forming part of the segment itself. Screws $S^2$ $S^2$ pass through these ears and into pieces $C^2$ $C^2$, having a hold upon the rods R R, as shown in Fig. 8. These pieces $C^2$ $C^2$ may, in fact, be made solid with said rods by soldering, or casting them together as one piece. The removal of the screws $S^2$ $S^2$ is all that is necessary to unfasten the segments from the frame-work below them.

It is sometimes desirable to adjust the position which the commutator occupies upon the shaft during rotation of the latter. Especially is this the case where the commutator-brushes are not made adjustable around the commutator. In Fig. 9 the commutator is provided with my attachment for this purpose. The commutator itself is mounted upon the shaft, but can be rotated thereon, the connections $d'$ to it being made flexible or movable.

J is the journal-box through which the shaft passes, bearing the commutator $K'$ $K^2$ loosely upon it. A piece, $d$, or rod fastened to the commutator, engages with a bar, $b$, projecting radially through a slot in the shaft at A in such a way that the bar $b$ may slide freely in a longitudinal direction upon the rod, but will move said rod and the connected commutator circumferentially whenever it is caused to change its position circumferentially upon the shaft. The bar $b$ is carried by a plug, Q, in the end of the shaft. The plug is pressed outward by a spring, as shown, which also tends to bring the bar $b$ to the outer end of the shaft-slot A. The slot A is inclined, like a screw-thread of high pitch, as shown. Any movement inward or outward of the plug Q will be followed by a change of position of the commutator upon the shaft. This change can be effected during the rotation of the shaft by any suitable arrangement for pressing the plug Q into a new position. For this purpose I employ a lever, L, pivoted at O, and set-screw H for adjusting the same. The end of the lever is rounded and bears against the center of the plug, so that the plug and shaft may revolve without interference from the stationary adjusting device.

Other devices might be used for adjusting the plug against the tension of the spring, suitable anti-friction connection between the plug and said adjusting device being, however, provided in case the latter be stationary, as is preferably the case.

In Fig. 10 similar parts are lettered as in Fig. 9.

I make no claim herein to the devices for adjusting the commutator-segments on the shaft while rotating, but reserve the same for the subject of a separate application.

I claim—

1. In a commutator constructed, substantially as herein described, with a series of supporting and conducting rods, R, for the commutator-segments, the combination, with a plate, G, through which said rods pass, of a layer of insulating material applied to the face of said plate, between the rods, as and for the purpose described.

2. The combination, with the rods or bars R, forming supports for the commutator-segments and conveying current thereto, of the flanges or plates G, faced or covered with a layer of insulating material, as and for the purpose specified.

3. The combination, with a commutator plate or segment for a dynamo-electric machine or electric motor, of an adjustable wearing-edge adjacent to the insulating-space between said segment and the adjoining segment, as and for the purpose described.

4. The combination, with a commutator plate or segment for a dynamo-electric machine or motor, of a removable wearing-edge applied thereto at a point adjoining the insulating-spaces of the commutator.

5. The combination, with a commutator plate or segment, of the removable and adjustable piece, constructed in the manner and for the purposes set forth.

6. The combination, with the commutator plates or segments, of armature-terminals passing through the shaft beneath said segments, and uniting-clamps extending from said terminals to rods or projections extending from the segment, substantially parallel with the shaft and electrically connected with the segments.

7. The combination, with the commutator-segments, of the supporting-rods R, electrically connected thereto, the armature-coil terminals parallel to said rods, and uniting-clamps, as and for the purpose described.

8. The combination of the flanges or plates, the uniting-rods carried thereby, commutator plates or segments resting upon the rods, and devices for removably clamping or securing the segments in place upon the rods.

9. The combination of the supporting rods or bars R, uniting the flanges or plates G, and commutator plates or segments provided with laterally-projecting ears, as and for the purpose described.

10. The combination of the supporting-rods R, commutator-segments resting upon the same, and clamping devices engaging with the rods and the segments for holding the latter in place upon the rods.

11. The combination of the rods R, the commutator-segments seated upon the rods, provided with laterally-projecting ears, and clamping devices engaging with the rods and with the ears, whereby said segments may be separately removed at pleasure.

12. The combination, with the supporting-rods R, of the commutator-segments resting upon the same, the piece C², and screws or bolts S².

13. A commutator for a dynamo-electric machine, consisting of metal supporting-flanges faced with insulating material, rods or supports parallel to the shaft and entering said flanges, and commutator-segments borne upon said rods, and provided with means for detachably securing them in place, so that any segment may be removed without disturbing any other portion of the commutator.

ELIHU THOMSON.

Witnesses:
E. WILBUR RICE,
F. L. HUNGERFORD.